(12) United States Patent
Hirade

(10) Patent No.: US 7,359,399 B2
(45) Date of Patent: Apr. 15, 2008

(54) CDMA PATH PROTECTION METHOD BASED ON PATH PROTECTION INFORMATION

(75) Inventor: Sei Hirade, Tokyo (JP)

(73) Assignee: NEC Corporation, Tokyo (JP)

( * ) Notice: Subject to any disclaimer, the term of this patent is extended or adjusted under 35 U.S.C. 154(b) by 879 days.

(21) Appl. No.: 10/475,313

(22) PCT Filed: Apr. 17, 2002

(86) PCT No.: PCT/JP02/03817

§ 371 (c)(1),
(2), (4) Date: Oct. 20, 2003

(87) PCT Pub. No.: WO02/087101

PCT Pub. Date: Oct. 31, 2002

(65) Prior Publication Data

US 2004/0105418 A1    Jun. 3, 2004

(30) Foreign Application Priority Data

Apr. 18, 2001   (JP)   ............................ 2001-119529

(51) Int. Cl.
*H04B 1/69*   (2006.01)
(52) U.S. Cl. ...................... 370/441; 370/320; 370/335; 370/342; 370/479; 455/450; 375/137; 375/147
(58) Field of Classification Search ................ 370/342, 370/216, 441, 335, 320, 479; 455/400–466; 375/131–137, 147
See application file for complete search history.

(56) References Cited

U.S. PATENT DOCUMENTS 5,490,165 A    2/1996   Blakeney, II et al.
6,222,834 B1 *  4/2001   Kondo ..................... 370/342
6,580,749 B1 *  6/2003   Miura ..................... 375/147
6,795,422 B2 *  9/2004   Ohsuge .................... 370/342
7,039,097 B2 *  5/2006   Terao ..................... 375/148
7,050,484 B2 *  5/2006   Hirade .................... 375/148
2004/0105418 A1 *  6/2004   Hirade .................... 370/342

FOREIGN PATENT DOCUMENTS

| EP | 1 087 540 A1 | 3/2001 |
| JP | 07-231278 A | 8/1995 |
| JP | 2853705 B2 | 11/1998 |
| JP | 11-261528 A | 9/1999 |

(Continued)

*Primary Examiner*—Firmin Backer
*Assistant Examiner*—Luat Phung
(74) *Attorney, Agent, or Firm*—Sughrue Mion, PLLC

(57) ABSTRACT

A path protection method for a CDMA reception apparatus is disclosed, which obtains correlation value levels while shifting the despreading timing of reception data little by little, searches for optimal reception timings, outputs a plurality of finger path timings, with respect to the reception data, as reception timings at which reception should be performed, and despreads the respective paths, thereby performing RAKE combining. If all protection paths are in the forward protection state upon execution of path backward protection and forward protection, a protection path with the lowest level is deleted, and a search path having the highest level among paths which are equal to or more than a threshold and detected by a searcher is registered in the deleted portion, thereby allowing assignment of a newly detected path even in the absence of a protection path space.

9 Claims, 18 Drawing Sheets

FOREIGN PATENT DOCUMENTS

| | | |
|---|---|---|
| JP | 2000-101549 A | 4/2000 |
| JP | 2000-115030 A | 4/2000 |
| JP | 2000-324016 A | 11/2000 |
| JP | 2002-26767 A | 1/2002 |
| JP | 2002-94413 A | 3/2002 |

* cited by examiner

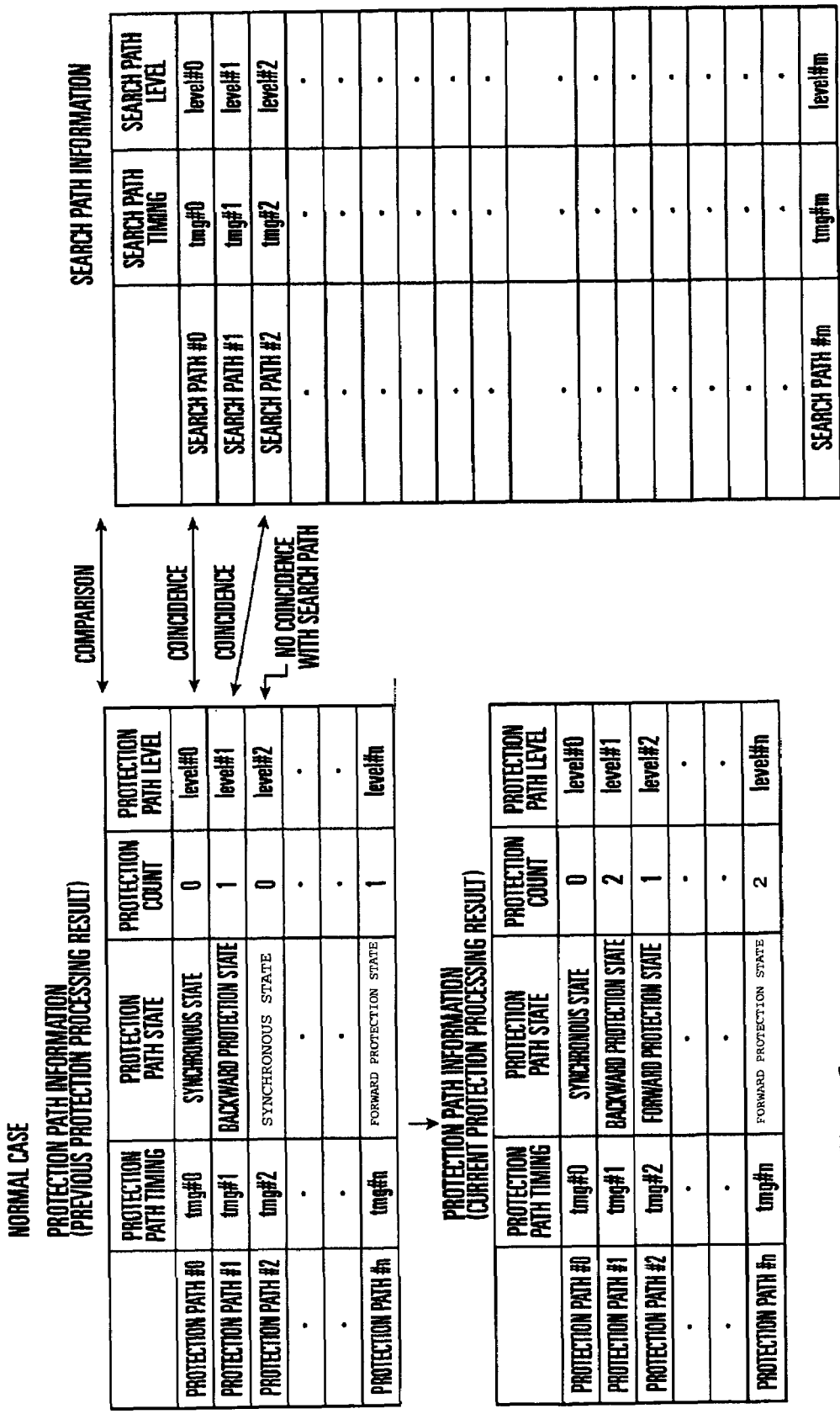
F I G. 6

FIG. 9

| | PROTECTION PATH INFORMATION | | | | | | SEARCH PATH INFORMATION | | |
|---|---|---|---|---|---|---|---|---|---|
| | PROTECTION PATH TIMING | PROTECTION PATH STATE | PROTECTION COUNT | PROTECTION PATH LEVEL | | | | SEARCH PATH TIMING | SEARCH PATH LEVEL |
| PROTECTION PATH #0 | tmg#0 | FORWARD PROTECTION STATE | 1 | level#0 | | SEARCH PATH #0 | | tmg#0 | level#0 |
| PROTECTION PATH #1 | tmg#1 | FORWARD PROTECTION STATE | 1 | level#1 | | SEARCH PATH #1 | | tmg#1 | level#1 |
| | · | FORWARD PROTECTION STATE | 2 | · | | · | | · | · |
| | · | FORWARD PROTECTION STATE | 2 | · | | · | | · | · |
| | · | FORWARD PROTECTION STATE | 1 | · | | · | | · | · |
| | · | FORWARD PROTECTION STATE | 2 | · | | · | | · | · |
| | · | FORWARD PROTECTION STATE | 1 | · | | · | | · | · |
| | · | FORWARD PROTECTION STATE | 2 | · | | · | | · | · |
| PROTECTION PATH #n | tmg#n | FORWARD PROTECTION STATE | 1 | level#n | | SEARCH PATH #m | | tmg#m | level#m |

IN CASE WHEREIN ALL PROTECTION PATHS ARE IN FORWARD PROTECTION STATE

COMPARISON

ALLOCATION OF NO SEARCH PATH

| PROTECTION PATH INFORMATION | | | | | | COMPARISON | | SEARCH PATH INFORMATION | | |
|---|---|---|---|---|---|---|---|---|---|---|
| | PROTECTION PATH TIMING | PROTECTION PATH STATE | PROTECTION COUNT | PROTECTION PATH LEVEL | | | | | SEARCH PATH TIMING | SEARCH PATH LEVEL |
| PROTECTION PATH #0 | tmg#0 | FORWARD PROTECTION STATE | 1 | level#0 | | | | SEARCH PATH #0 | tmg#0 | level#0 |
| PROTECTION PATH #1 | tmg#1 | FORWARD PROTECTION STATE | 1 | level#1 | | REGISTRATION OF SEARCH PATH #0 | | SEARCH PATH #1 | tmg#1 | level#1 |
| · | · | FORWARD PROTECTION STATE | 2 | · | | | | · | · | · |
| · | · | FORWARD PROTECTION STATE | 2 | · | | | | · | · | · |
| · | · | BACKWARD PROTECTION STATE | 1 | · | | | | · | · | · |
| · | · | FORWARD PROTECTION STATE | 1 | · | | | | · | · | · |
| · | · | FORWARD PROTECTION STATE | 2 | · | | | | · | · | · |
| · | · | FORWARD PROTECTION STATE | 2 | · | | | | · | · | · |
| PROTECTION PATH #m | tmg#n | FORWARD PROTECTION STATE | 1 | level#n | | | | SEARCH PATH #m | tmg#m | level#m |

CDMA PATH PROTECTION METHOD BASED ON PATH PROTECTION INFORMATION

TECHNICAL FIELD

The present invention relates to a CDMA (Code Division Multiple Access) reception apparatus and path protection method and, more particularly, to a CDMA reception apparatus and path protection method which improve reception characteristics by performing optimal path protection in accordance with protection path information.

BACKGROUND ART

In general, CDMA reception apparatuses are designed to allow a plurality of users to perform communication using the same frequency band. The respective users are identified by using spreading codes. In such mobile communication, since the transmission paths for the respective reception waves in multiplexed wave propagation vary in lengths, multiplexed waves with different propagation delay times interfere with each other.

Since a mobile station moves relative to base stations, signals through paths as propagation paths are subjected to Rayleigh variation in over-the-horizon communication. In CDMA communication, a plurality of multipath signals with different propagation delay times, which are subjected to Rayleigh variation, are collected to be in-phase combined (RAKE combined), thereby obtaining a diversity effect and improving reception characteristics.

Conventionally, there has been known a CDMA reception apparatus having a searcher section with a path control function for searching a finger section, a correlator group, an adder group, and post-addition correlation values for high-level reception timings and determining the reception timings at which signals should be received by the finger section.

In such a CDMA reception apparatus, when a path for a reception signal is to be detected, search paths from the searcher section are compared with tracking paths by a tracking means, backward protection is applied to detection of a coincidence of paths, forward protection is applied to detection of loss of a path, and the path capture state of a tracking path is classified into a complete loss state, backward protection state, complete protection state, or forward protection state, thereby obtaining a path state.

Conventional protection will be described with reference to the state transition diagram of protection paths in FIG. 7.

In backward protection, a path (reception timing) detected for the first time is protected as a path in a backward protection state 71 instead of immediately being set as a path in a synchronous state 73, and is determined as a path in the synchronous state 73 only after the path is kept detected at the same reception timings as a designated backward protection stage count 72.

In forward protection, if a path detected by previous processing cannot be detected by current processing, the path is protected as a path in a forward protection state 74 instead of immediately being deleted and setting an idle state 76, and is deleted from protection paths only after the path cannot be consecutively detected by a designated forward protection stage count 75.

As described above, it is necessary to perform protection so as not to frequently change the assignment of protection paths even with variations in level due to fading or slight changes in reception timing.

As an example of such techniques, "Spread Spectrum Communication Receiver" disclosed in Japanese Patent No. 2853705 is known.

This reference discloses a technique of improving demodulation characteristics even in the presence of a plurality of paths whose correlation levels are almost equal to noise level under multipath fading.

The above conventional CDMA reception apparatus and path protection method have the following drawback. Assume that all protection paths are paths in the forward protection state. When a state in which forward protection stage count cannot be detected continues, no protection path is deleted, and even a newly detected high-level path cannot be assigned.

In addition, the above conventional CDMA reception apparatus and path protection method have the following drawback. In sector changing operation in which the number of sectors to be used increases, a high-level path is newly detected at a high possibility. However, if no free space for a protection path is available, a detected path cannot be assigned until a free space is produced.

Furthermore, the conventional protection method has the following problem. A path set in the forward protection state is not deleted when a state in which forward protection stage count cannot be detected continues. For this reason, even when a mobile terminal moves out of the shadow of a building and waves that have not been detected can be directly detected, a detected path cannot be assigned until a free space for a protection path is produced.

DISCLOSURE OF INVENTION

It is an object of the present invention to provide a CDMA reception apparatus and path protection method in which when all protection paths are paths in the forward protection state, a newly detected high-level path can be assigned even if a state in which forward protection stage cannot be detected continues and no path is deleted.

It is another object of the present invention to provide a CDMA reception apparatus and a path protection method which need not prepare many protection paths and fingers to prevent all protection paths becoming paths in the forward protection state, and allow a reduction in apparatus size.

It is still another object of the present invention to provide a CDMA reception apparatus and path protection method which can eliminate restrictions on a forward protection stage count.

The following are the main CDMA reception apparatuses and path protection methods of the present invention which are designed to achieve the above objects.

A path protection method for a CDMA reception apparatus according to the present invention is characterized by comprising the finger path timing generating step of obtaining correlation value levels while shifting a despreading timing of reception data little by little, searching for optimal reception timings, and generating a plurality of finger path timings as reception timings at which the reception data should be received, the detection step of despreading the respective paths at the reception timings designated by the finger path timings, performing symbol synchronization, and obtaining a plurality of finger outputs, the RAKE combining step of adding and in-phase combining the plurality finger outputs to obtain RAKE combined data, and the decoding step of decoding the RAKE combined data to obtain decoded data, wherein in the finger path timing generating step, backward protection is performed such that a reception timing which is a path detected for the first time is protected as a path in a backward protection state instead of immediately being set as a path in a synchronous state, and is determined as a path in the synchronous state only after the path is kept detected at the same reception timings as a designated backward protection stage count, forward protection is performed such that when a path detected by previous processing cannot be detected by current processing, the path is protected as a path in a forward protection state instead of immediately being deleted and setting an idle state, and is deleted from protection paths only after the path cannot be consecutively detected by the number of times equal to a designated forward protection stage count, and in the finger path timing generating step, of protection paths protected as paths in the forward protection state, at least a protection path with a lowest level is deleted, and at least a path having a highest level among currently detected paths is registered as a protection path in a deleted portion.

BRIEF DESCRIPTION OF DRAWINGS

FIG. 6 is a view for explaining protection path information and search path information;

FIG. 9 is a view showing protection path information and search path information when all protection paths are paths in the forward protection state;

FIG. 10 is a view showing deletion of a protection path with the lowest level in FIG. 9;

FIG. 11 is a view showing registration of a search path with the highest level in FIG. 10;

BEST MODE FOR CARRYING OUT THE INVENTION

An embodiment of the present invention will be described with reference to the accompanying drawings.

Figure 1:
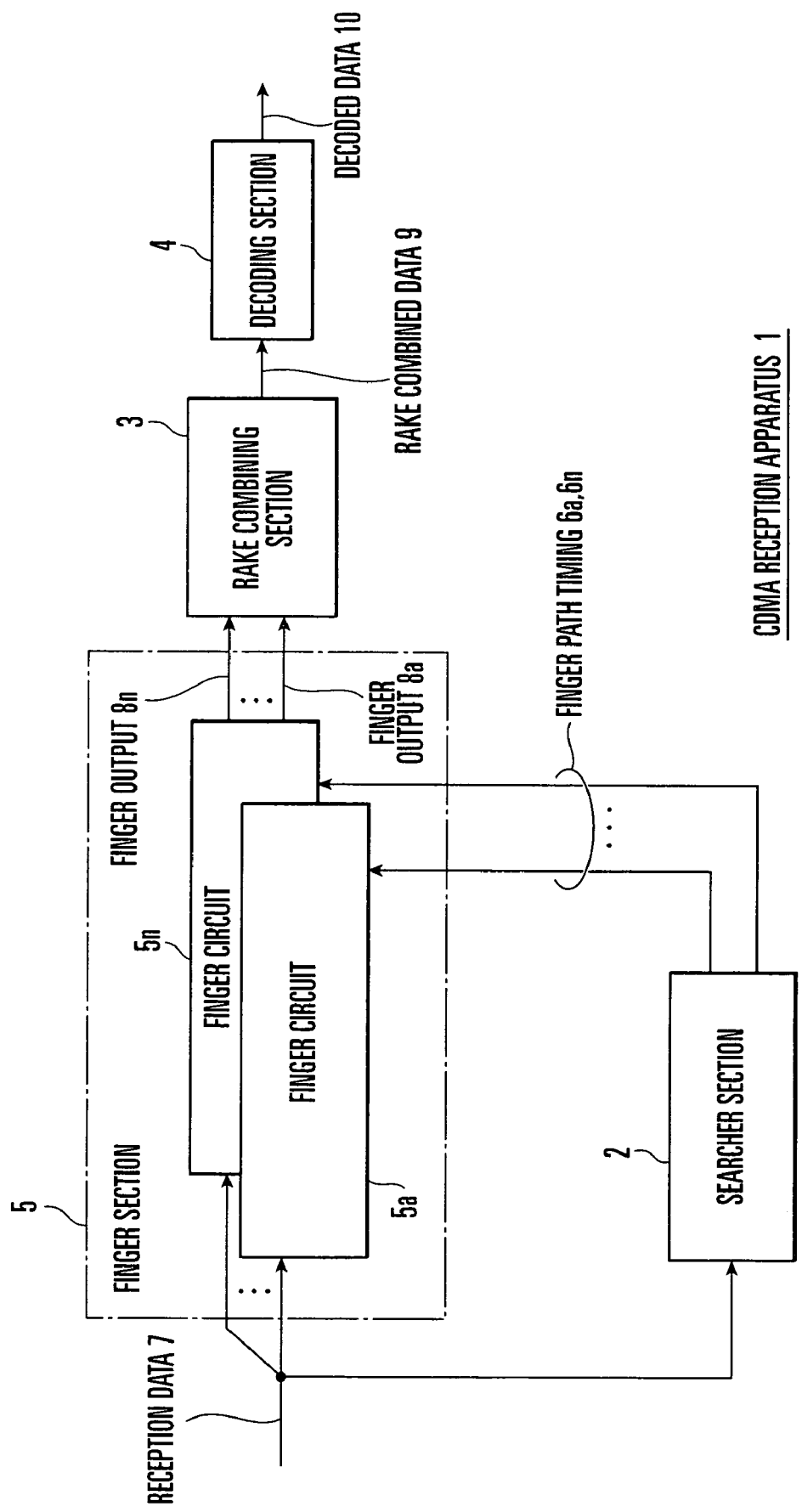
FIG. 1 is a block diagram showing a CDMA reception apparatus and path protection method according to an embodiment of the present invention.

FIG. 1 is a block diagram showing a CDMA reception apparatus and path protection method according to an embodiment of the present invention.

Referring to FIG. 1, a CDMA reception apparatus 1 of the present invention is comprised of a searcher section 2, a RAKE combining section 3, a decoding section 4, and a finger section 5 having finger circuits 5a and 5n.

With respect to reception data 7 input to the CDMA reception apparatus 1, the finger section 5 (finger circuits 5a and 5n) despreads the respective paths at the reception timings designated by finger path timings 6a and 6n, and performs symbol synchronization. The finger section 5 then outputs the resultant data as finger outputs 8a and 8n. The searcher section 2 obtains correlation value levels while shifting the despreading timing of the reception data 7 little by little, and searches for the optimal reception timings. The searcher section 2 then outputs, to the finger circuits 5a and 5n, respectively, the finger path timings 6a and 6n as the reception timings at which data should be received by the finger section 5. The RAKE combining section 3 adds and in-phase-combines the outputs from the finger section 5 and outputs the resultant data as RAKE combined data 9. The decoding section 4 decodes the RAKE combined data 9 and outputs decoded data 10.

A description about a finger will be given. In a CDMA reception apparatus, in order to process reception signals from a plurality of paths, i.e., multipath, a plurality of finger circuits included in a finger section are provided in correspondence with the plurality of paths. The circuits processing the reception signals are called finger circuits because the reception signals being processed are in a finger form. Since such signals in the form of a finger are processed, the corresponding section is termed a finger section.

"RAKE" of the RAKE combining section literally means a rake as a tool. Since signals output from the respective fingers are processed as if they were collected by a rake, the corresponding section is termed a RAKE combining section.

The operation of this embodiment will be described in more detail with reference to FIG. 1.

The reception data 7 input to the CDMA reception apparatus 1 is output to the finger section 5 and searcher section 2. The searcher section 2 obtains correlation value levels while shifting the despreading timing of the reception data 7 little by little, and searches for the optimal reception timings. The searcher section 2 then outputs, to the finger circuits 5a and 5n of the finger section 5, the finger path timings 6a and 6n as peak timings which are reception timings at which data should be received by the finger section 5.

The finger section 5 despreads the reception data 7 at the reception timings designated by the finger path timings 6a and 6n, and performs detection processing for symbol synchronization. The finger outputs 5a and 5n output from the finger section 5 are output to the RAKE combining section 3 to be in-phase added. The resultant data is output as the RAKE combined data 9. The RAKE combined data 9 after addition is decoded into the decoded data 10 by the decoding section 4. In this case, the finger circuits 5a and 5n of the finger section 5 are prepared in accordance with the number of paths processed by the CDMA reception apparatus 1. If the number of finger circuits of the finger section 5 is given by n=10, RAKE combining of up to 10 paths can be realized.

Figure 2:
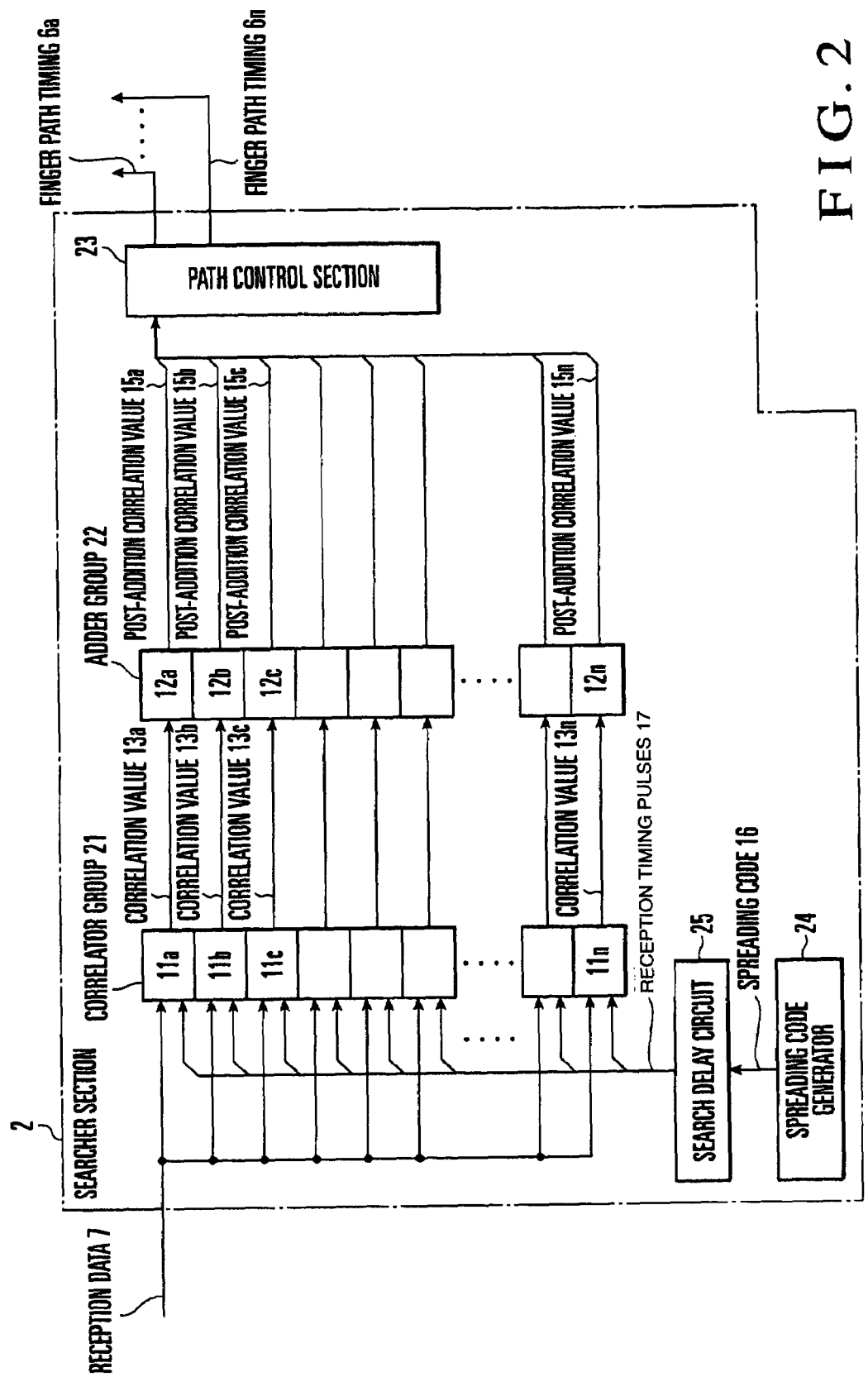
FIG. 2 is a detailed block diagram showing an example of a searcher section in FIG. 1.

FIG. 2 is a detailed block diagram showing an example of the searcher section in FIG. 1.

Note that the same reference numerals or symbols as in FIG. 1 denote the same constituent elements in FIG. 2, and a description thereof will be omitted.

Referring to FIG. 2, the searcher section 2 includes a spreading code generator 24 which generates and outputs a spreading code 16, a search delay circuit 25 which outputs the timings of the spreading code 16 as reception timing pulses 17 which differ from each other little by little, a correlator group 21 having correlators 11a, 11b, 11c, and 11n which despread the reception data 7 at the reception timings 17 which differ from each other little by little, and output correlation values 13a, 13b, 13c, and 13n, an adder group 22 having adders 12a, 12b, 12c, and 12n which add (integrate) the correlation values 13a, 13b, 13c, and 13n by a designated number of times, and respectively output post-addition correlation values 15a, 15b, 15c, and 15n as a delay profile, and a path control section 23 which searches the post-addition correlation values 15a, 15b, 15c, and 15n for high-level reception timings and outputs the reception timings of the respective paths as finger path timings 6a and 6n to the finger section 5.

The operation of the searcher section 2 will be described with reference to FIG. 2.

The reception data 7 is input to the correlators 11a, 11b, 11c, and 11n of the correlator group 21. The correlators 11a, 11b, 11c, and 11n perform despreading at the reception timings of the reception timing pulses 17 which differ from each other little by little. The correlation values 13a, 13b, 13c, and 13n output from the correlators 11a to 11n are input to the adders 12a to 12n of the adder group 22, respectively.

The adders 12a to 12n add (integrate) the correlation values 13a to 13n by a designated number of times (which can be changed as a parameter) and output the post-addition correlation values (delay profile) 15a, 15b, 15c, and 15n to the path control section 23, respectively.

The spreading code generator 24 generates and outputs the spreading code 16 used for despreading in the correlator group 21, and outputs it to the search delay circuit 25. The search delay circuit 25 outputs, to the correlators 11a to 11n, the spreading code 16 as the reception timing pulses 17 which differ from each other little by little.

The path control section 23 detects peaks by searching the post-addition correlation values 15a to 15n for high-level reception timings, and determines whether to set each path as a protection path. The path control section 23 then outputs, to the finger section 5, the reception timings of the respective paths determined as protection paths as the finger path timings 6a and 6n.

Figure 3:
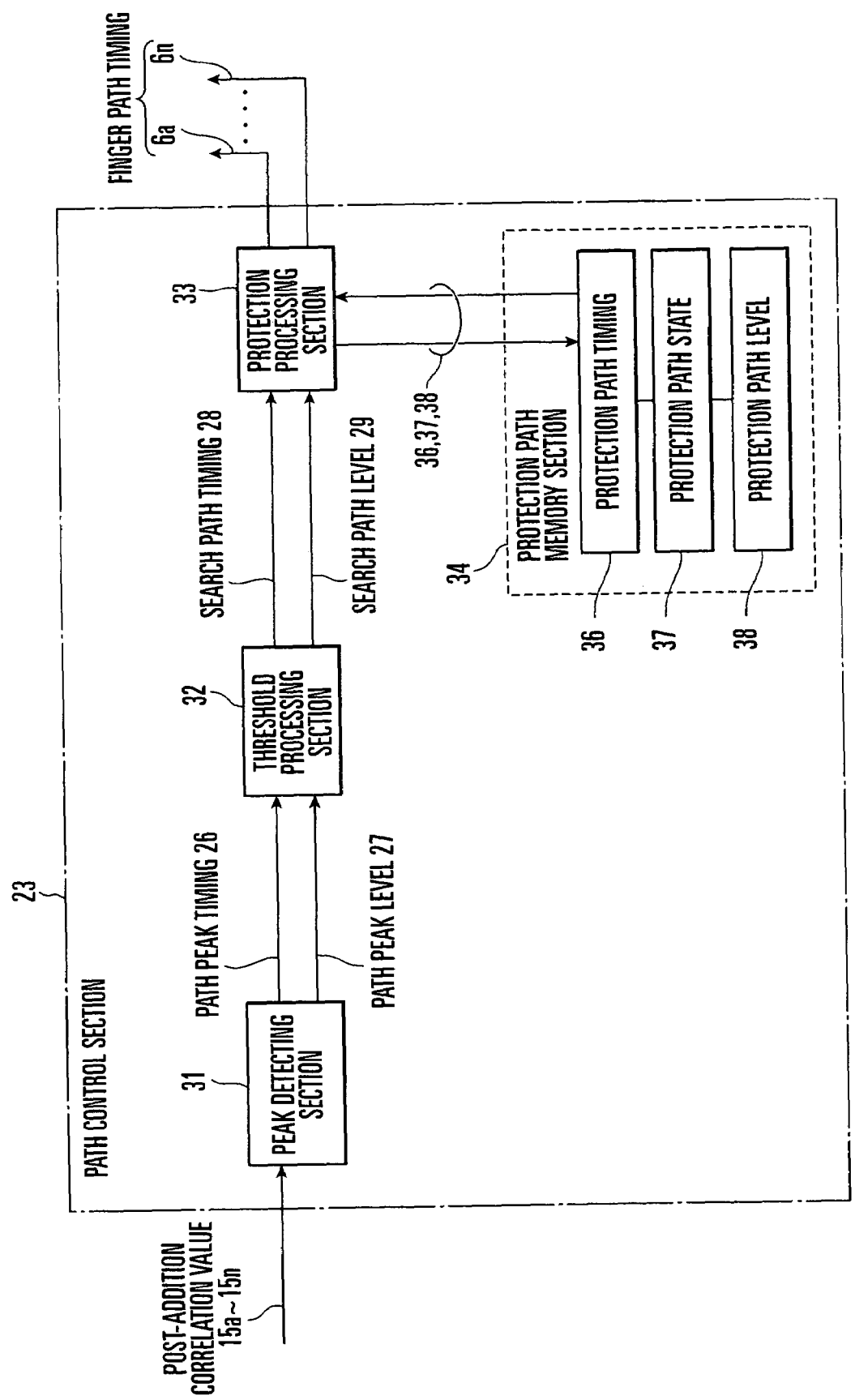
FIG. 3 is a detailed block diagram showing an example of a path control section in FIG. 2.

FIG. 3 is a detailed block diagram showing an example of the path control section in FIG. 2.

Note that the same reference numerals or symbols as in FIG. 2 denote the same constituent elements in FIG. 3, and a description thereof will be omitted.

The operation of the path control section 23 will be described next with reference to FIG. 3. Referring to FIG. 3, the path control section 23 includes a peak detecting section 31, threshold processing section 32, protection section 33, and protection path memory section 34.

The peak detecting section 31 detects peaks by searching the post-addition correlation values 15a to 15n for high-level reception timings corresponding to a designated peak count, and outputs path peak timings 26 and path peak levels 27 of the respective paths to the threshold processing section 32. Note that the designated peak count can be changed as a parameter.

The threshold processing section 32 performs threshold processing for selecting paths equal to or more than various kinds of thresholds on the basis of the input path peak levels 27, and outputs the paths equal to or more than the thresholds as search path timings 28 and search path levels 29 to the protection section 33.

The protection section 33 reads out, from the protection path memory section 34, protection path timings 36 containing sector information and branch information as previous protection results, protection path states 37 including a protection path count, and protection path levels 38, and compares them with the search path timings 28 and search path levels 29 which are the currently detected paths so as to perform protection, thereby determining protection paths. The protection section 33 outputs, to the finger section 5, the reception timings of the respective paths determined as protection paths as the finger path timings 6a and 6n containing sector information and branch information, and writes the protection path timings 36, protection path states 37, and protection path levels 38 as current protection results in the protection path memory section 34.

Figure 4:
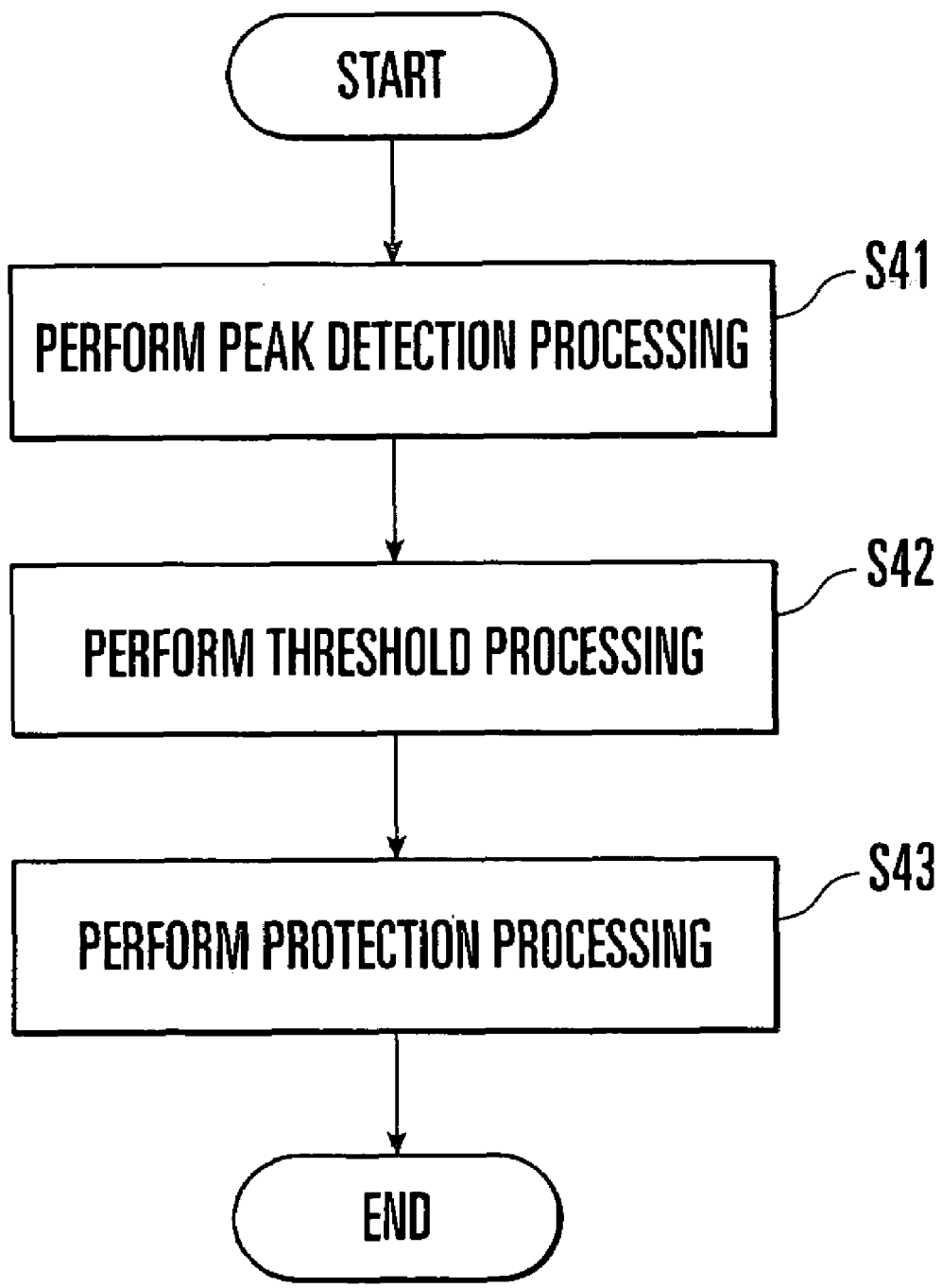
FIG. 4 is a flow chart showing the operation of the path control section in FIG. 3.

FIG. 4 is a flow chart showing the operation of the path control section 23 in FIG. 3.

Figure 5:
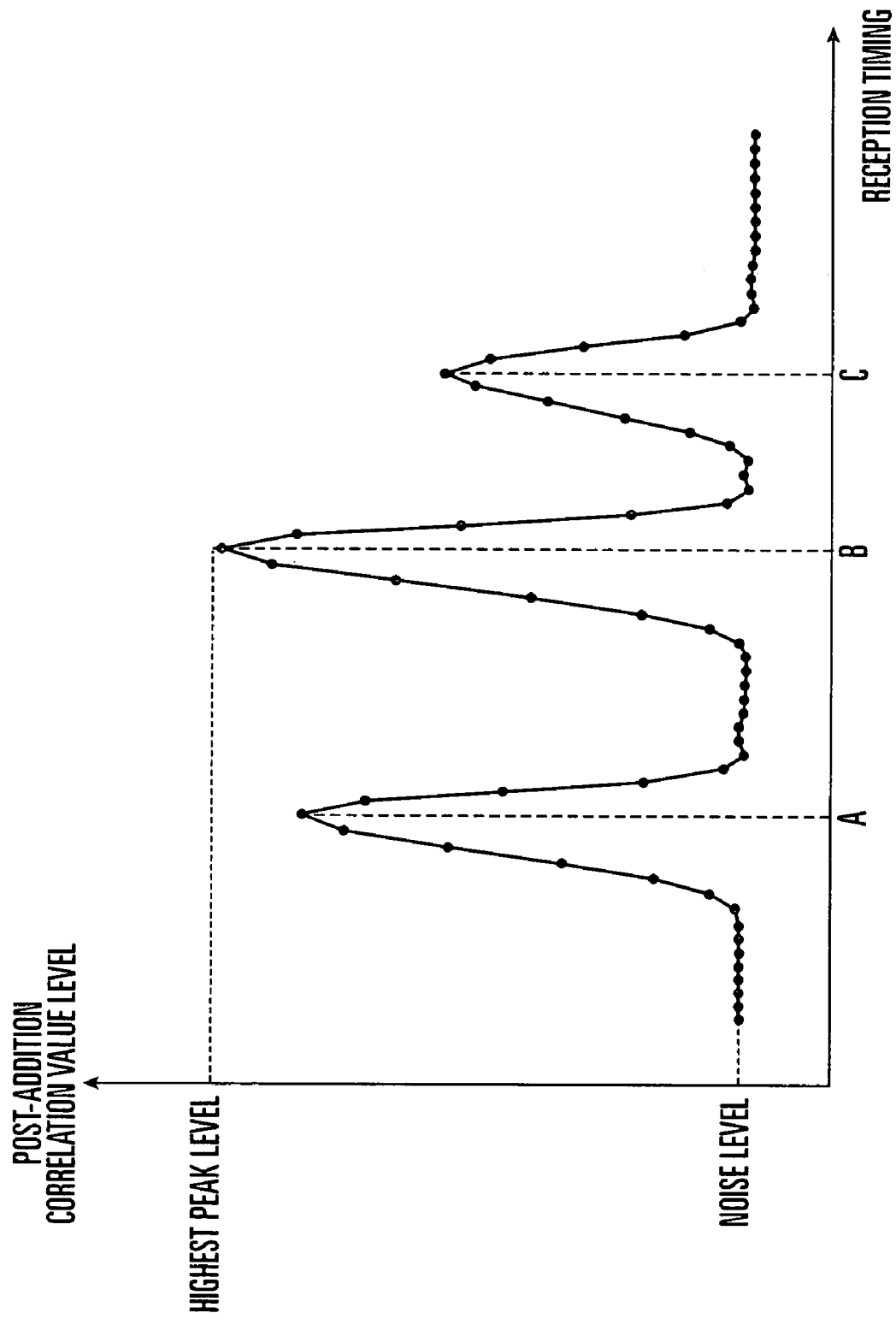
FIG. 5 is a view showing a delay profile indicating the relationship between the reception timing and the correlation value.

FIG. 5 is a view showing a delay profile indicating the relationship between the reception timing and the correlation value. Referring to FIG. 5, the abscissa represents the reception timing; and, the ordinate, the level of a post-addition correlation value. FIG. 5 shows the presence of three pulses A, B, and C which differ in reception timing, and the presence of multipath. Referring to FIG. 5, reference symbols A, B, and C denote reception timings at which the levels of the respective paths become highest. The level of the path B is the highest among those of the reception timings A to C.

The operation of the path control section 23 will be described in more detail with reference to FIGS. 3, 4, and 5.

The peak detecting section 31 performs peak detection processing of detecting peak by searching the post-addition correlation values 15a to 15n for high-level reception timings corresponding to a designated peak count (which can be changed as a parameter) and outputting the path peak timings 26 and path peak levels 27 of the respective paths to the threshold processing section 32 (S41 in FIG. 4).

In the next step (S42 in FIG. 4), the threshold processing section 32 performs threshold processing of selecting paths equal to or more than various kinds of thresholds from the input path peak levels 27, and outputs the paths equal to or higher than the thresholds as the search path timings 28 and search path levels 29 to the protection section 33.

In the next step (S43 in FIG. 4), the protection section 33 reads out the protection path timings 36, protection path states 37, and protection path levels 38 as previous protection results from the protection path memory section 34, and compares them with the search path timings 28 and search path levels 29 as currently detected paths so as to perform protection, thereby determining protection paths. The protection section 33 then outputs the reception timings of the respective paths determined as protection paths as the finger path timings 6a and 6n to the finger section 5.

In step S43, the protection path timings 36, protection path states 37, and protection path levels 38 as current protection results are written in the protection path memory section 34.

FIG. 6 is a view for explaining protection path information and search path information.

Referring to FIG. 6, protection path timing tmg#0 of protection path #0 coincides with search path timing tmg#0 of search path #0 upon comparison with search path timings tmg#0 to #m of search paths #0 to #m, and the protection path state of protection path #0 continues to be a synchronous state. In this case, protection path timing tmg#0 is updated at search path timing tmg#0 of search path #0, and protection path level level#0 is updated at search path level #0 of search path #0.

In addition, protection path timing tmg#1 of protection path #1 coincides with search path timing tmg#2 of search path #2 upon comparison with search path timings tmg#0 to #m of remaining search paths #0 to #m, and the protection path state of protection path #1 changes from a backward protection state with protection count=1 to a backward protection state with protection count=2 after the protection count is incremented. In this case, protection path timing #1 is updated at search path timing tmg#2 of search path #2, and protection path level level#1 is updated at search path level #2 of search path #2.

Furthermore, protection path timing tmg#2 of protection path #2 coincides with no search path timing upon comparison with search path timings tmg#0 to #m of remaining search paths #0 to #m, and the protection path state of protection path #2 changes from a synchronous state to a forward protection state with protection count=1.

Figure 7:
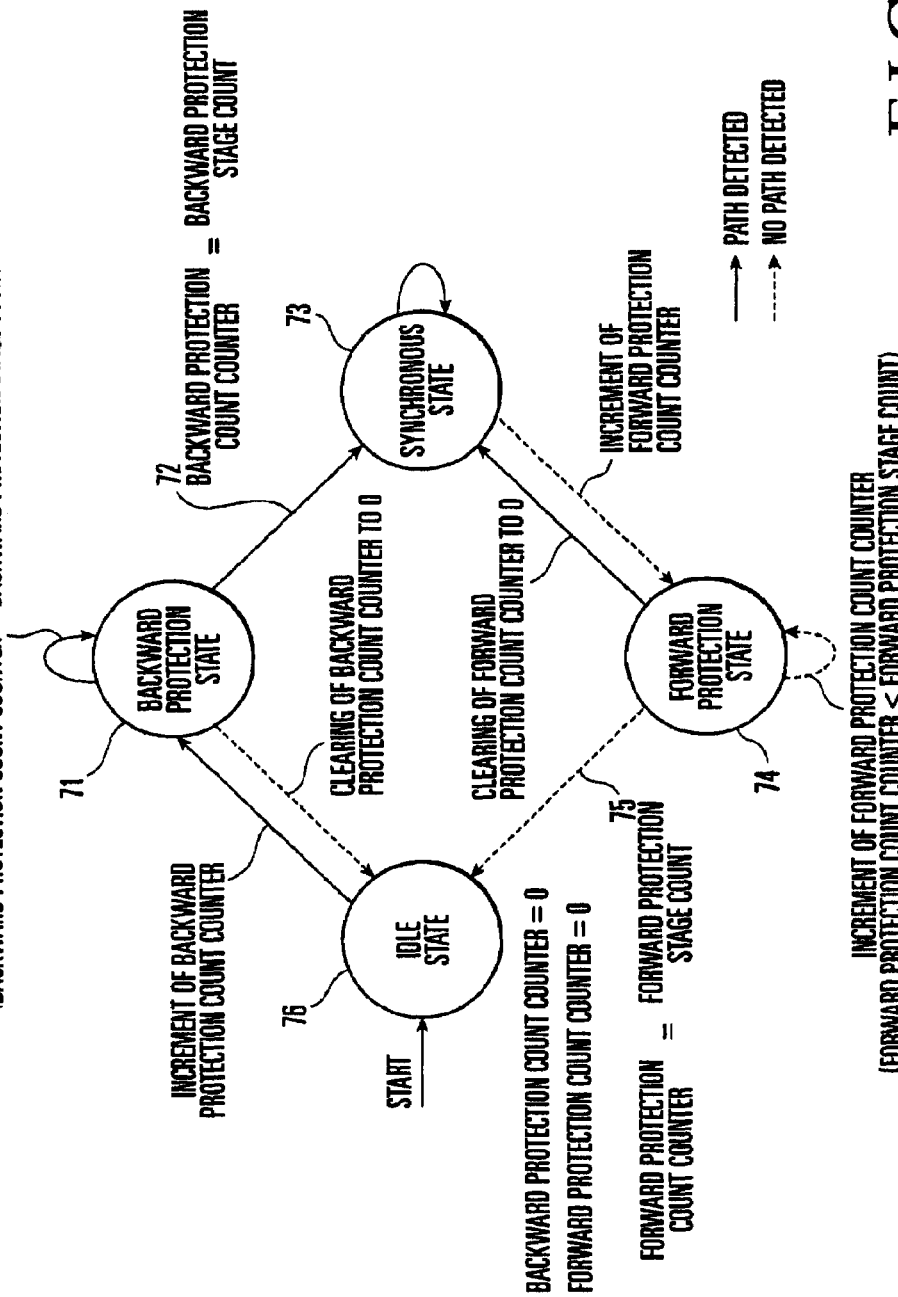
FIG. 7 is a view for explaining the state transitions of protection paths.

FIG. 7 is a view for explaining the state transitions of protection paths.

Referring to FIG. 7, protection means backward protection in which a path (reception timing) currently detected for the first time is protected as a path in a backward protection state 71 instead of being immediately set as a path in a synchronous state 73, and is determined as a path in the synchronous state 73 only after the path is kept detected at the same reception timings as a designated backward protection stage count 72.

In a first idle state 76, backward protection count counter=0 and forward protection count counter=0, and the backward protection count counter is incremented every time a path is detected at a reception timing. If the backward protection count counter is less than the backward protection stage count 72, the backward protection state 71 continues. When the backward protection count counter coincides with the backward protection stage count 72, the state undergoes a transition to the synchronous state 73. When no path can be detected in the backward protection state 71, the backward protection count counter is cleared to 0, and the state undergoes a transition to the idle state 76.

Likewise, if a path detected by previous processing cannot be detected by current processing, the corresponding path is protected as a path in a forward protection state 74. This prevents the corresponding path from being deleted from protection paths and being set to the idle state 76 (as discussed below with respect to FIG. 10). The corresponding path is deleted from protection paths only after the path cannot be consecutively detected by the number of times equal to a forward protection stage count 75 (forward protection).

The forward protection count counter is incremented every time no path is detected from the synchronous state 73. If the forward protection count counter is less than the forward protection stage count 75, the forward protection state 74 continues. When the forward protection count counter coincides with the forward protection stage count, the state undergoes a transition to the idle state 76.

If a path is detected in the forward protection state 74, the forward protection count counter is cleared to 0, and the state undergoes a transition to the synchronous state 73.

As described above, it is necessary to perform protection so as not to frequently change the assignment of protection paths even with variations in level due to fading or slight changes in reception timing.

The state transitions of protection paths will be described in more detail with reference to FIGS. 6 and 7.

The maximum protection path count in protection corresponds to the value of n of the finger section 5. If n=10 in the finger section 5, the maximum protection path count in protection becomes 10.

As described above, in protection, a path (reception timing) currently detected for the first time is protected as a path in the backward protection state 71 instead of being immediately set as a path in the synchronous state 73, and is determined as a path in the synchronous state 73 only after the path is kept detected at the same reception timings as the designated backward protection stage count 72 (backward protection).

Likewise, if a path detected by previous processing cannot be detected by current processing, the corresponding path is protected as a path in the forward protection state 74 instead of being immediately deleted to set the idle state 76, and is deleted from protection paths only after the path cannot be consecutively detected by the number of times equal to the forward protection stage count 75 (forward protection). The backward protection stage count 72 and forward protection stage count 75 can be changed as parameters.

Therefore, protection can be performed so as not to frequently change the assignment of protection paths even with variations in level due to fading or the like or slight changes in reception timing.

Figure 8:
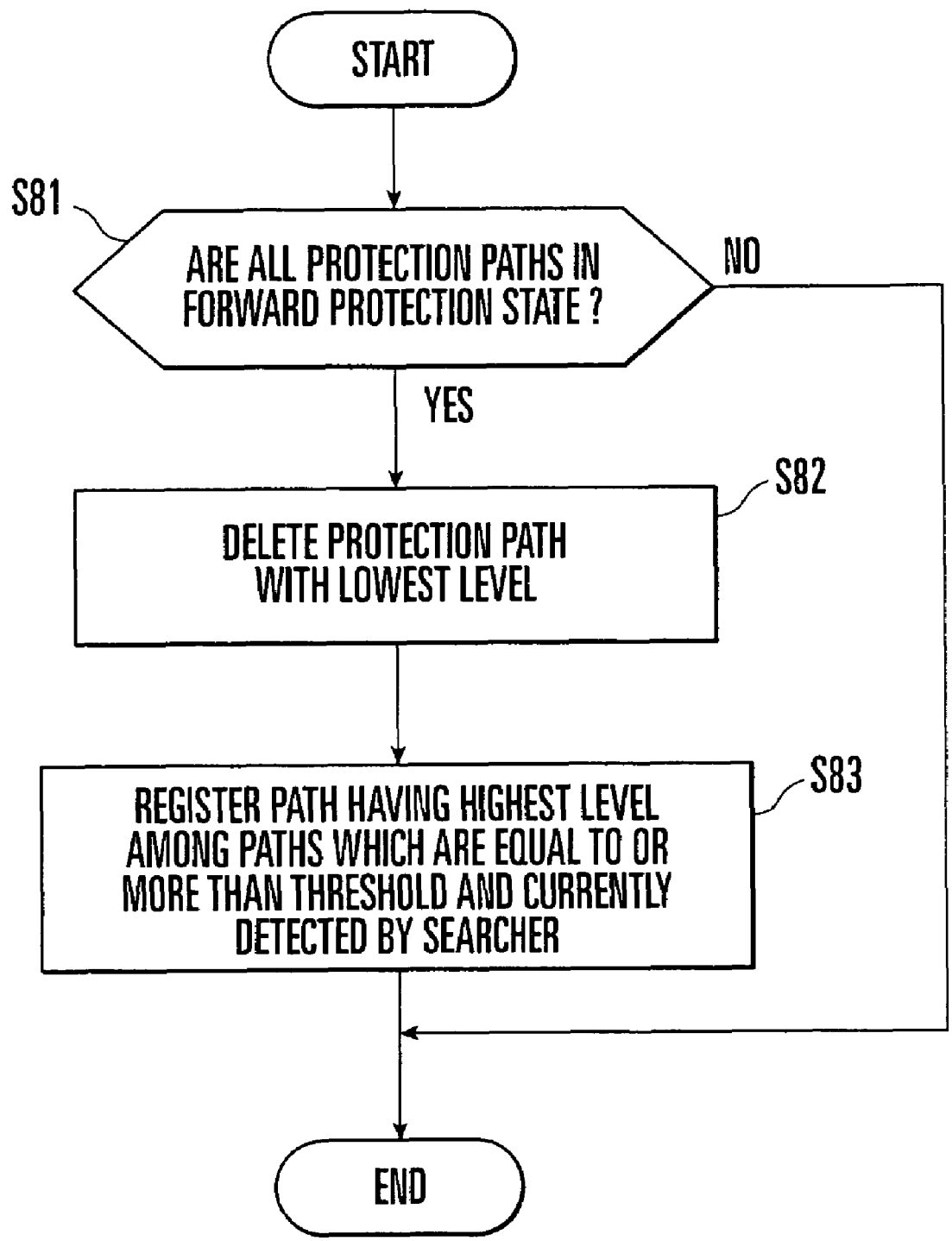
FIG. 8 is a flow chart showing operation to be performed when protection paths are in the forward protection state.

FIG. 8 is a flow chart showing operation to be performed when protection paths are in the forward protection state.

Referring to FIG. 8, it is checked in step 81 (S81) whether all protection paths are set in the forward protection state. If all the paths are in the forward protection state, a protection path with the lowest level is deleted (S82). In next step S83, search path #0 is registered in a deleted portion, which is a path having the highest level among the paths which are equal to or more than a threshold and currently detected by the searcher (S83).

FIG. 9 is a view showing protection path information and search path information in a case wherein all protection paths are paths in the forward protection state.

Referring to FIG. 9, protection path timings tmg#0 to tmg#n of protection paths #0 to #n coincide with none of search path timings tmg#0 to tmg#m of search paths #0 to #m. In this case, since no search path is assigned, all protection paths #0 to #n are set in the forward protection state.

Figure 10:
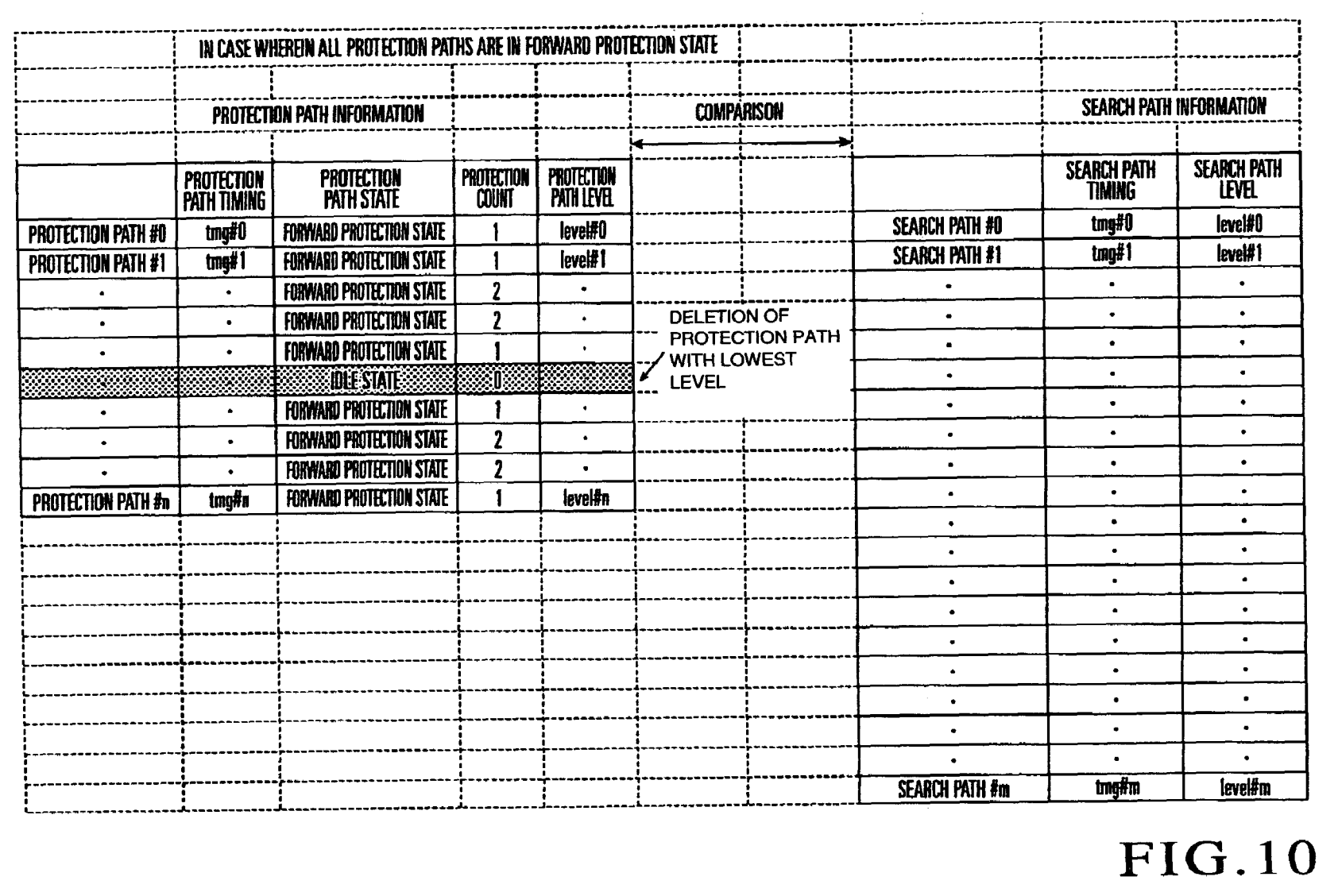

FIG. 10 is a view showing deletion of a protection path with the lowest level in FIG. 9.

FIG. 11 is a view showing registration of a search path with the highest level in FIG. 10.

When all the protection path states of protection paths #0 to #n are the forward protection state in the case shown in FIG. 9, a protection path with the lowest level is deleted to set the idle state as shown in FIG. 10, and search path #0 with the highest level among search path information is registered as shown in FIG. 11.

This can eliminate the conventional problem that when all protection paths are paths in the forward protection state, even a newly found path with a high level cannot be assigned until a path is deleted because a state in which forward protection stage count cannot be detected continues.

Another operation example for protection paths according to the present invention will be described next.

Figure 12:
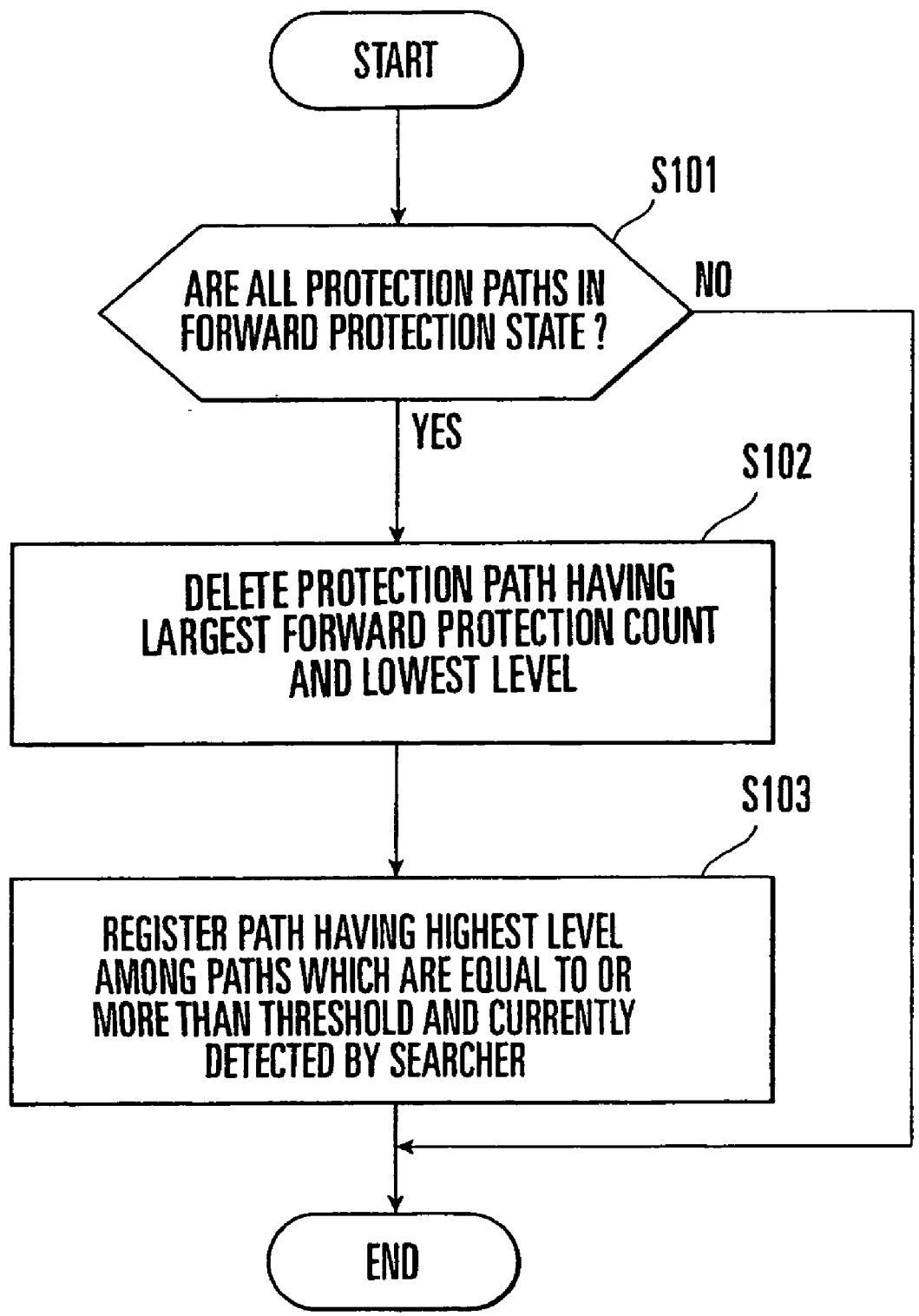
FIG. 12 is a flow chart showing another operation for the protection paths in FIG. 8.

FIG. 12 is a flow chart showing another operation for protection paths in FIG. 8.

Referring to FIG. 12, it is checked whether or not all protection paths are set in the forward protection state, and the flow advances to the next step if all the protection paths are set in the forward protection state (step S101). In step S102, a protection path with the largest forward protection count and the lowest level is deleted (S102). In step S103, a path is registered in the deleted portion, which is a path having the highest level among paths which are equal to or more than a threshold and currently detected by the searcher (S103). This processing differs from that in FIG. 8 in that a protection path with the largest forward protection count and the lowest level is deleted.

Figure 13:
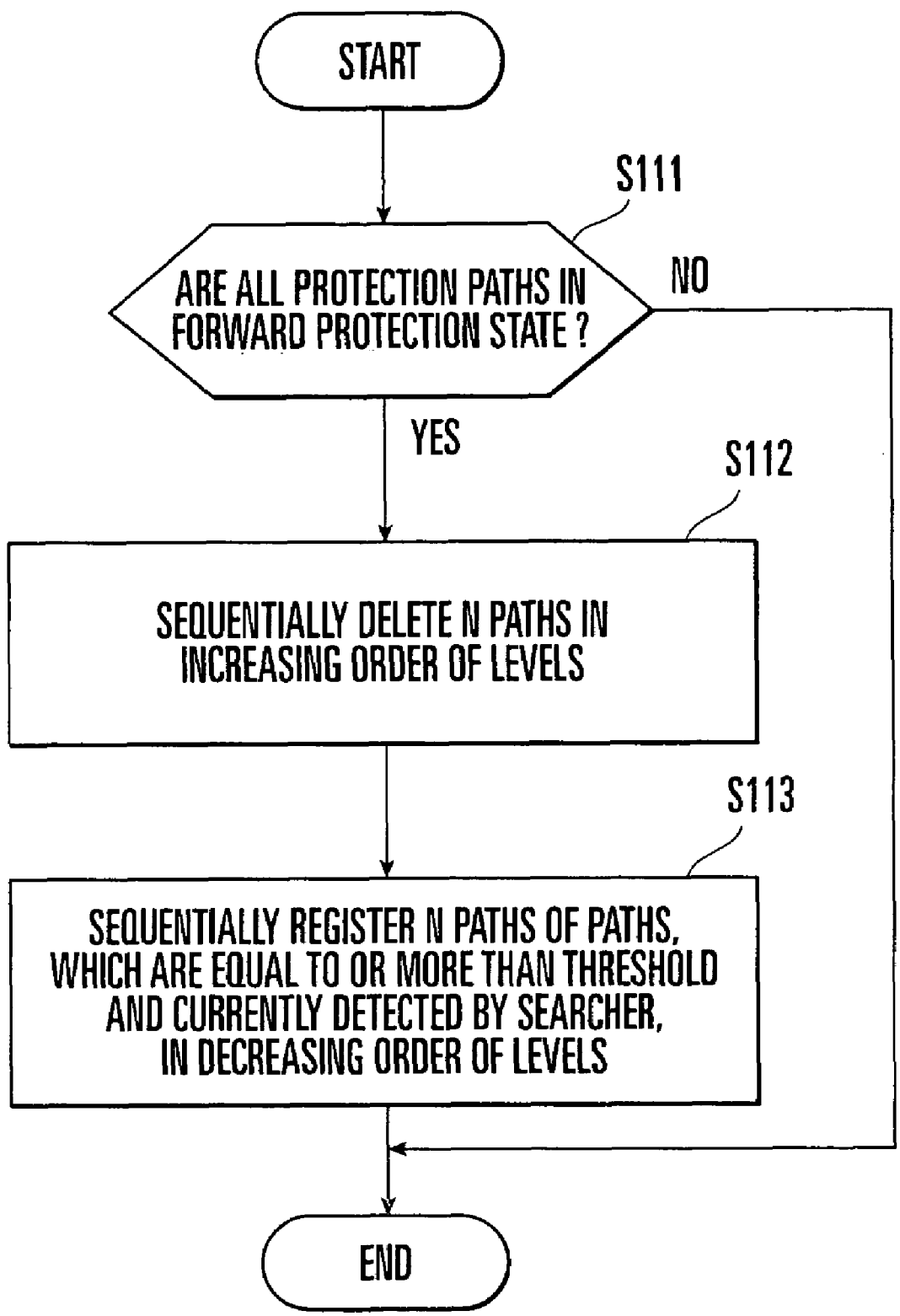
FIG. 13 is a flow chart showing still another operation for the protection paths in FIG. 8.

FIG. 13 is a flow chart showing still another operation for protection paths in FIG. 8.

Referring to FIG. 13, it is checked whether or not all protection paths are set in the forward protection state, and the flow advances to the next step if all the protection paths are set in the forward protection state (step S111). In step S112, N protection paths (N can be changed as a parameter) are sequentially deleted in increasing order of levels. In step S113, N search paths of the paths which are equal to or more than a threshold and currently detected by the searcher are sequentially registered in the deleted portions in decreasing order of levels.

Figure 14:
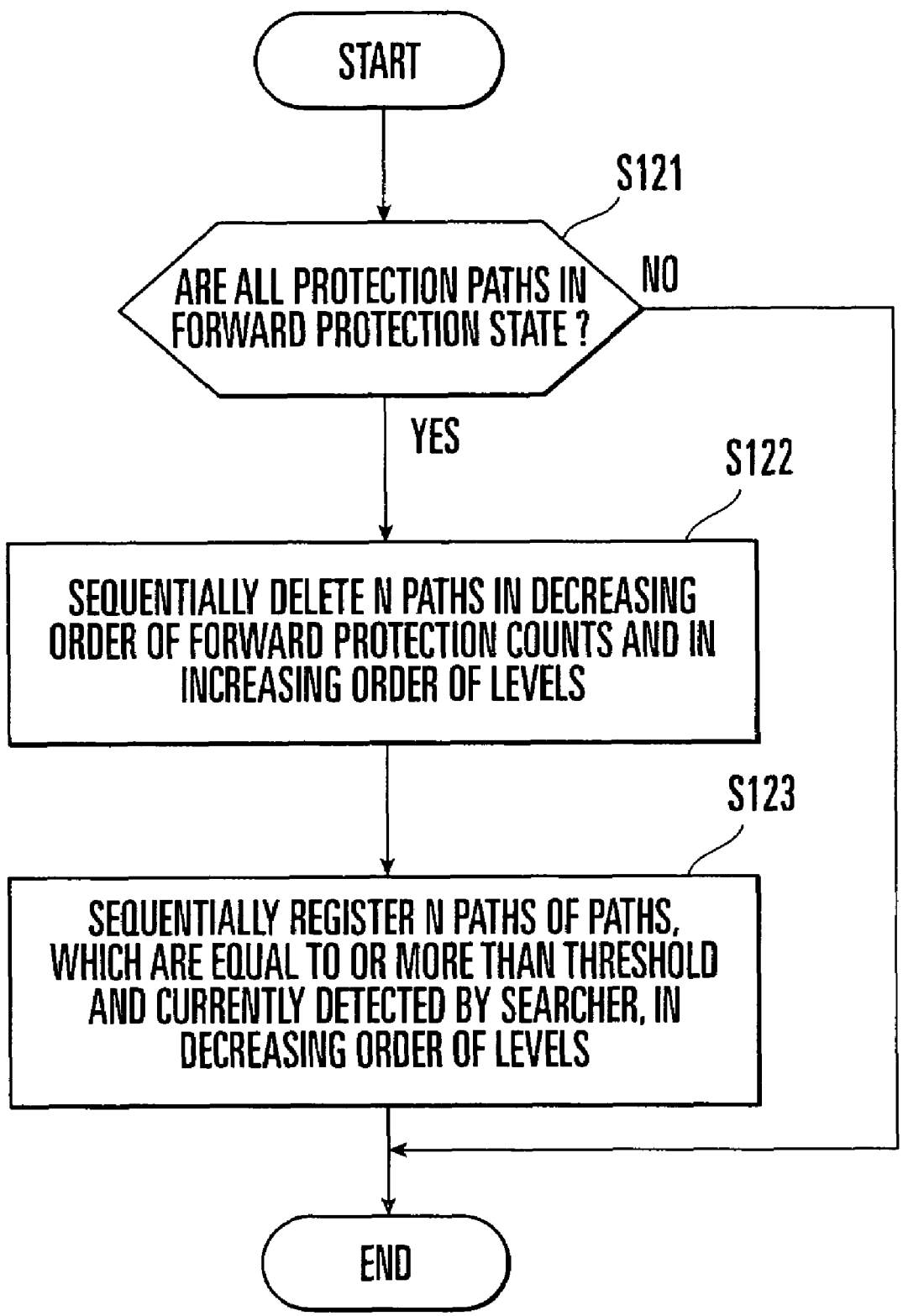
FIG. 14 is a flow chart showing operation of protection paths in a combination of the sequences in FIGS. 12 and 13.

FIG. 14 is a flow chart showing operation for protection paths in a combination of the sequences in FIGS. 12 and 13.

Referring to FIG. 14, it is checked whether or not all protection paths are set in the forward protection state, and the flow advances to the next step if all the protection paths are set in the forward protection state (step S121). In step S122, N protection paths (N can be changed as a parameter) are sequentially deleted in decreasing order of forward protection counts and increasing order of levels. In step S123, N search paths of the paths which are equal to or more than a threshold and currently detected by the searcher are sequentially registered in the deleted portions in decreasing order of levels.

Figure 15:
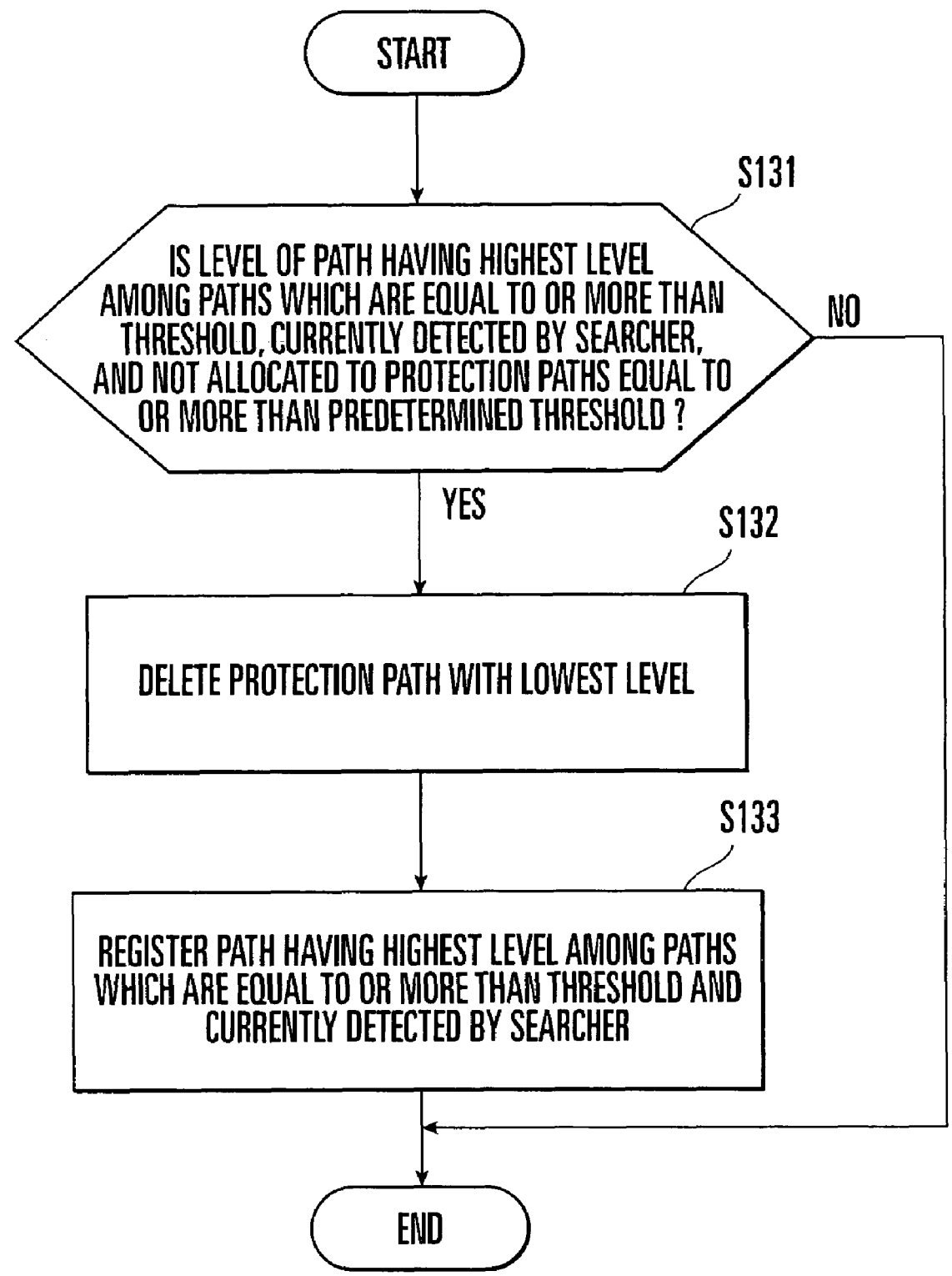
FIG. 15 is a flow chart showing still another operation for protection paths.

FIG. 15 is a flow chart showing still another operation for protection paths.

Referring to FIG. 15, it is checked in step S131 whether or not the level of a search path having the highest level among paths which are equal to or more than a threshold, currently detected by the searcher, and not assigned to protection paths is equal to or more than a predetermined threshold, and the flow advances to the next step if the level is equal to or more than the predetermined threshold (S131). In step S132, a protection path with the lowest level is deleted (S132).

In step S133, a path having the highest level among the paths which are equal to or more than a threshold and currently detected by the searcher is registered in the deleted portion.

As predetermined thresholds, the various thresholds in the threshold processing section 32 may be used or different thresholds may be prepared.

Figure 16:
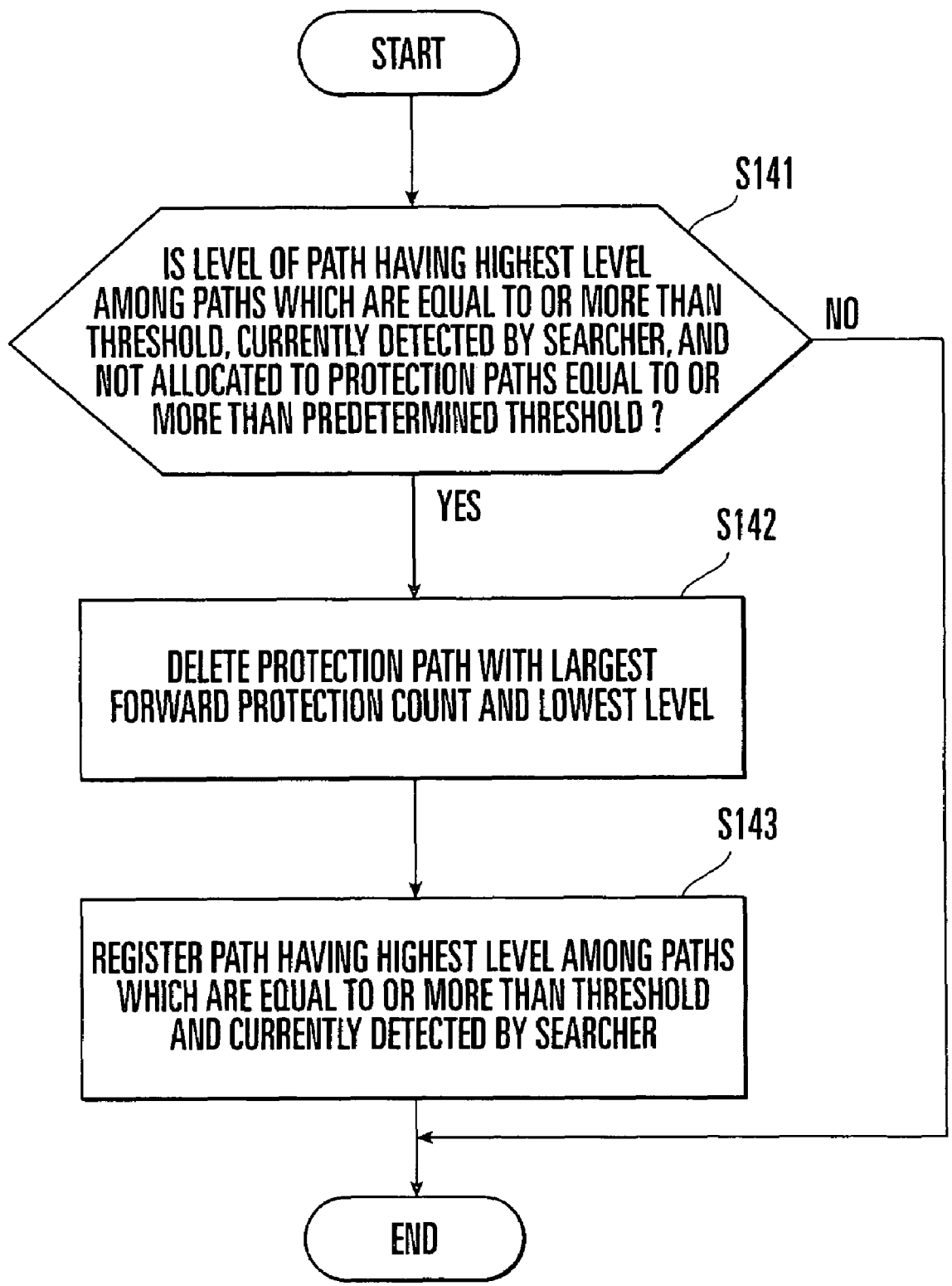
FIG. 16 is a flow chart showing still another operation for the protection paths in FIG. 15.

FIG. 16 is a flow chart showing still another operation for protection paths in FIG. 15.

Referring to FIG. 16, it is checked in step S141 whether or not the level of a search path having the highest level among paths which are equal to or more than a threshold, currently detected by the searcher, and not assigned to protection paths is equal to or more than a predetermined threshold, and the flow advances to the next step if the level is equal to or more than the predetermined threshold.

In step S142, a protection path with the largest forward protection count and the lowest level is deleted. In step S143, a path having the highest level among the paths currently detected by the searcher is registered in the deleted portion.

Figure 17:
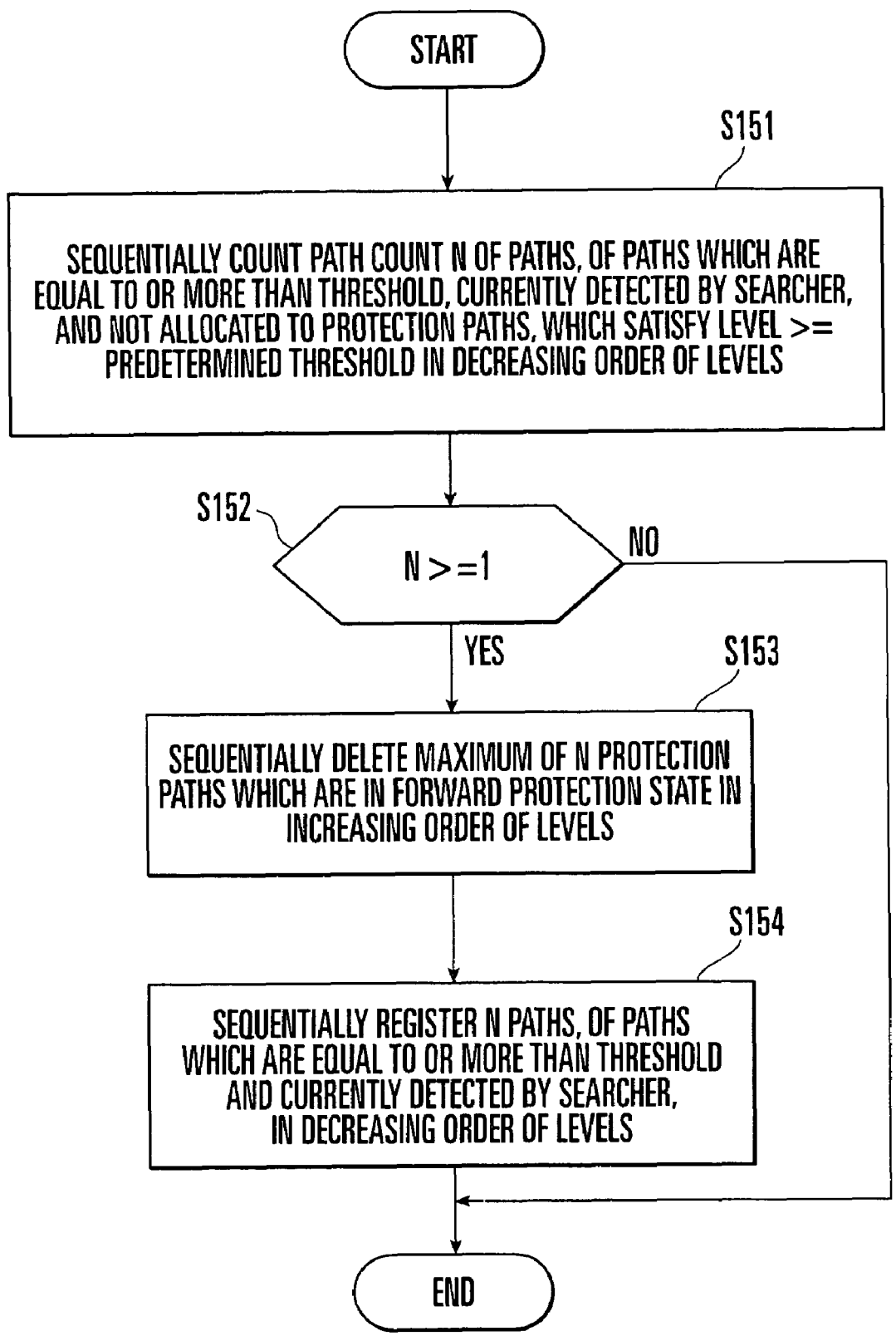
FIG. 17 is a flow chart showing still another operation for the protection paths.

FIG. 17 is a flow chart showing still another operation for protection paths.

Referring to FIG. 17, of the paths which are equal to or more than a threshold, currently detected by the searcher, and not assigned to protection paths, path count=N of search paths equal to or more than a predetermined threshold is sequentially counted in decreasing order of levels (step S151).

It is checked in the next step whether or not N>=1, and the flow advances to the next step if N>=1 (step S152).

In step S153, a maximum of N paths are sequentially deleted from protection paths which are set in the forward protection state in increasing order of levels (no paths other than paths in the forward protection state are deleted).

In step S154, N search paths of the paths equal to or more than a threshold which are currently detected by the searcher are registered in the deleted portions in decreasing order of levels.

Figure 18:
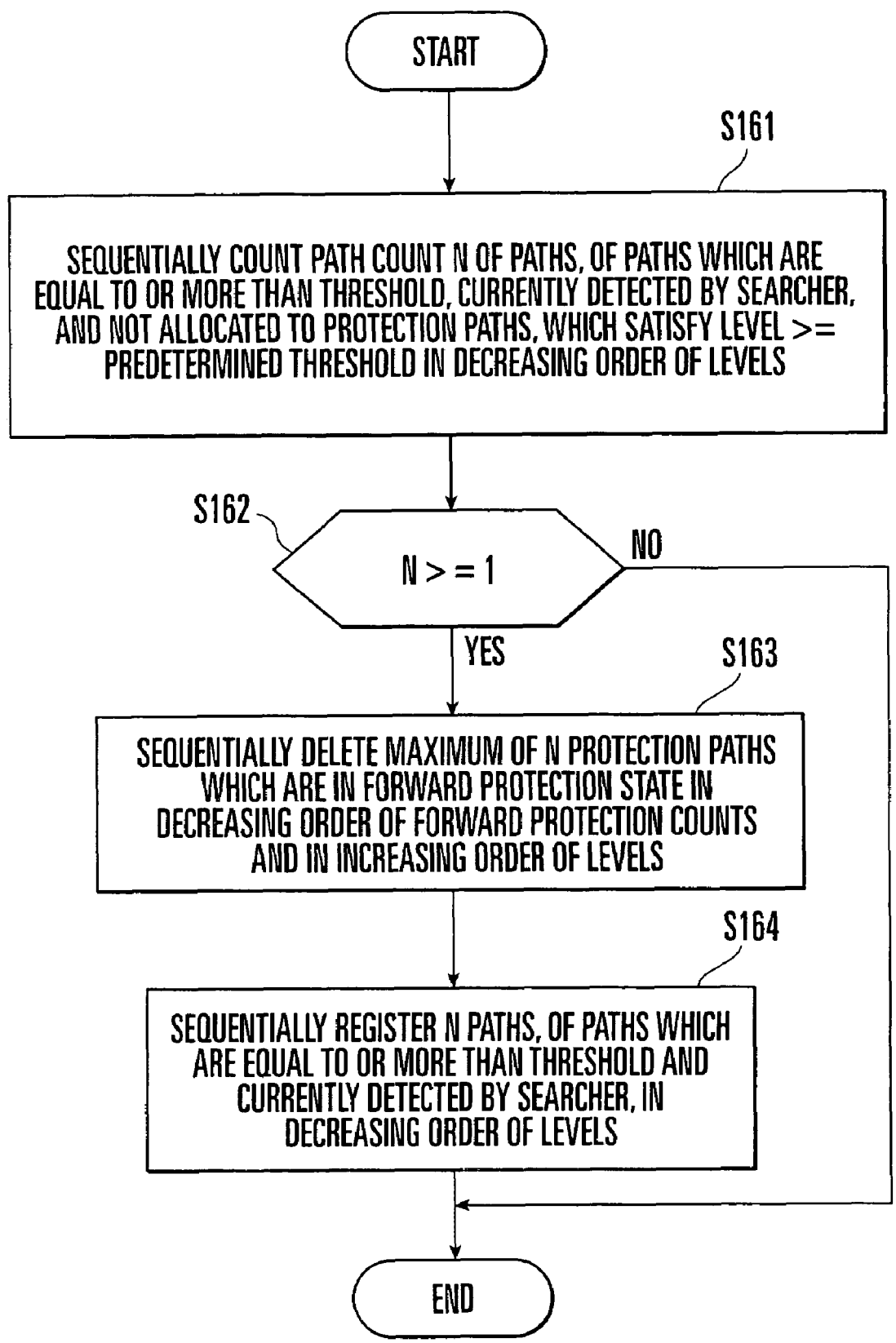
FIG. 18 is a flow chart showing operation for protection paths in a combination of the sequences in FIGS. 16 and 17.

FIG. 18 is a flow chart showing operation of protection paths in a combination of the sequences in FIGS. 16 and 17.

Referring to FIG. 18, of the paths which are equal to or more than a threshold, currently detected by the searcher, and not assigned to protection paths, path count=N of search paths equal to or more than a predetermined threshold is sequentially counted in decreasing order of levels (step S161).

It is checked in step S162 whether or not N>=1, and the flow advances to the next step if N>=1.

In step S163, a maximum of N paths are sequentially deleted from protection paths which are set in the forward protection state in decreasing order of forward protection stage counts and in increasing order of levels (no paths other than paths in the forward protection state are deleted).

In step S164, N search paths of the paths which are equal to or more than a threshold and currently detected by the searcher are registered in the deleted portions in decreasing order of levels.

As described above, the CDMA reception apparatus and path protection method according to the present invention improve the reception characteristics by performing optimal path protection in accordance with protection path information.

According to the present invention, in conventional protection performed by the protection section 33, if all protection paths are in the forward protection state, a protection path with the lowest level is deleted to produce a free space for a protection path. This makes it possible to register a search path having the highest level among the paths which are equal to or more than a threshold and currently detected by the searcher.

This can eliminate the conventional problem that when all protection paths are set in the forward protection state, even a newly detected path with a high level cannot be assigned until a path is deleted because a state in which forward protection stage count cannot be detected continues.

As has been described above, the CDMA reception apparatus and path protection method according to the present invention delete a protection path with the lowest level when all protection paths are in the forward protection state, and can register a path having the highest level among the paths which are equal to or more than a threshold and detected by the searcher. Even if, therefore, a state in which forward protection stage count cannot be detected continues and no path is not deleted while all protection paths are in the forward protection state, a newly found high-level path can be assigned.

In addition, there is no need to prepare sufficient numbers of protection paths and fingers to prevent all protection paths from being set in the forward protection state. This makes it possible to achieve a reduction in apparatus size.

Furthermore, the present invention can eliminate the following restriction. In a propagation environment in which fading gradually varies, setting a large forward protection stage count so as not to disconnect a path even with a decrease in level will improve the reception characteristics. Setting a large forward protection stage count, however, will prolong the time required for deletion, resulting in a delay in assigning a newly found high-level path. For this reason, the forward protection stage count need not be reduced to a certain degree.

The invention claimed is:

1. A path-protection method for a CDMA reception apparatus, characterized by comprising
    a finger path timing generating step of obtaining correlation value levels while shifting a despreading timing of reception data, searching for optimal reception timings, and generating a plurality of finger path timings as reception timings at which reception data should be received,
    a detection step of despreading respective paths at the reception timings designated by the finger path timings, performing symbol synchronization, and obtaining a plurality of finger outputs,
    a RAKE combining step of adding and in-phase combining the plurality of finger outputs to obtain RAKE combined data; and
    a decoding step of decoding the RAKE combined data to obtain decoded data,
    wherein in the finger path timing generating step, backward protection is performed such that a reception timing which is a path detected for a first time is protected as a path in a backward protection state instead of immediately being set as a path in a synchronous state, and is determined as a path in the synchronous state only after the path is kept detected at the same reception timings as a designated backward protection stage count, forward protection is performed such that when a path detected by previous processing cannot be detected by current processing, the path is protected as a path in a forward protection state instead of immediately being deleted and setting an idle state, and is deleted from protection paths only after the path cannot be consecutively detected by the number of times equal to a designated forward protection stage count, and
    in the finger path timing generating step, of protection paths protected as paths in the forward protection state, at least a protection path with a lowest level is deleted, and at least a path having a highest level among currently detected paths is registered as a protection path in a deleted portion.

2. A path protection method for a CDMA reception apparatus according to claim 1, characterized in that in the finger path timing generating step, it is determined whether or not all the protection paths are in the forward protection state, a protection path with a lowest level is deleted if all the protection paths are in the forward protection state, and a path having a highest level among currently detected paths which are not less than a threshold is registered as a protection path in a deleted portion.

3. A path protection method for a CDMA reception apparatus according to claim 1, characterized in that in the finger path timing generating step, it is determined whether or not all the protection paths are paths in the forward protection state, a protection path having a largest forward protection count and a lowest level is deleted if all the protection paths are paths in the forward protection state, and a path having a highest level among currently detected paths which are not less than a threshold is registered as a protection path in a deleted portion.

4. A path protection method for a CDMA reception apparatus according to claim 1, characterized in that in the finger path timing generating step, it is determined whether or not all the protection paths are paths in the forward protection state, N (N is an integer not less than 1) protection paths are sequentially deleted in increasing order of levels if all the protection paths are paths in the forward protection state, and N paths, of currently detected paths which are not less than a threshold, are sequentially registered as protection paths in deleted portions in decreasing order of levels.

5. A path protection method for a CDMA reception apparatus according to claim 1, characterized in that in the finger path timing generating step, it is determined whether or not all the protection paths are paths in the forward protection state, N (N is an integer not less than 1) protection paths are sequentially deleted in decreasing order of forward protection counts and in increasing order of levels if all the protection paths are paths in the forward protection state, and N paths, of currently detected paths which arenot less than a threshold, are sequentially registered as protection paths in deleted portions in decreasing order of levels.

6. A path protection method for a CDMA reception apparatus according to claim 1, characterized in that in the finger path timing generating step, it is determined whether or not a level of a path having a highest level among currently detected paths which are not less than a threshold and not assigned to forward protection paths is not less than a predetermined threshold, a protection path with a lowest level is deleted if the level is not less than the predetermined threshold, and a path having a highest level among currently detected paths which are not less than a threshold is registered as a protection path in a deleted portion.

7. A path protection method for a CDMA reception apparatus according to claim 1, characterized in that in the finger path timing generating step, it is determined whether or not a level of a path having a highest level among currently detected paths which are not less than a threshold and not assigned to forward protection paths is not less than a predetermined threshold, a protection path with the largest forward protection count and the lowest level is deleted if the level is not less than the predetermined threshold, and a path having a highest level among-currently detected paths which are not less than a threshold is registered as a protection path in a deleted portion.

8. A path protection method for a CDMA reception apparatus according to claim 1, characterized in that in the finger path timing generating step, whether N>=1 is determined by counting path count=N, of currently detected paths which are not less than a threshold and not assigned to the protection paths, which are not less than a predetermined threshold in decreasing order of levels, a maximum of N protection paths which are in the forward protection state are deleted in increasing order of levels if N >=1, and N paths, of currently detected paths which are not less than a threshold, are sequentially registered as protection paths in deleted portions in decreasing order of levels.

9. A path protection method for a CDMA reception apparatus according to claim 1, characterized in that in the finger path timing generating step, whether $N>=1$ is determined by counting path count=N, of currently detected paths which are not less than a threshold and not assigned to the protection paths, which are not less than a predetermined threshold in decreasing order of the forward protection counts and in increasing order of levels, a maximum of N protection paths which are in the forward protection state are deleted in increasing order of levels if $N>=1$, and N paths, of currently detected paths which are not less than a threshold, are sequentially registered as protection paths in deleted portions in decreasing order of levels.

* * * * *

UNITED STATES PATENT AND TRADEMARK OFFICE
CERTIFICATE OF CORRECTION

| | |
|---|---|
| PATENT NO. | : 7,359,399 B2 |
| APPLICATION NO. | : 10/475313 |
| DATED | : April 15, 2008 |
| INVENTOR(S) | : Sei Hirade |

It is certified that error appears in the above-identified patent and that said Letters Patent is hereby corrected as shown below:

Col. 1 Line 57 Delete "forward" Insert --backward--

Signed and Sealed this

Thirtieth Day of December, 2008

JON W. DUDAS
*Director of the United States Patent and Trademark Office*